(No Model.)
H. ENDEMANN.
TREATING RATTAN.
No. 368,523. Patented Aug. 16, 1887.
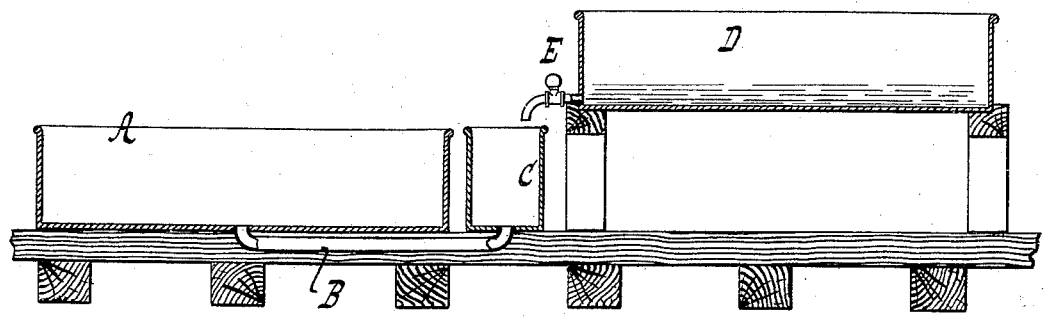
WITNESSES:
William Miller
Otto Hufeland
INVENTOR
Hermann Endemann
BY
Van Santvoord & Hauff
ATTORNEYS

UNITED STATES PATENT OFFICE.

HERMANN ENDEMANN, OF BROOKLYN, ASSIGNOR TO FRANKLIN D. NEWTON, OF QUEENS, NEW YORK.

TREATING RATTAN.

SPECIFICATION forming part of Letters Patent No. 368,523, dated August 16, 1887.

Application filed December 23, 1886. Serial No. 222,419. (No specimens.)

*To all whom it may concern:*

Be it known that I, HERMANN ENDEMANN, a citizen of the United States, residing at Brooklyn, in the county of Kings and State of New York, have invented new and useful Improvements in Treating Rattan, of which the following is a specification.

This invention relates to a treatment of rattan, as set forth in the following specification and claims.

In carrying out the present process I confine myself to temperatures below the boiling-point. Under these circumstances the treatment of the cane to remove the silex or glaze occupies some time, but the cane does not become stringy or unsightly; also, by carrying out the process at a temperature below the boiling-point, carbonate of an alkali can be safely applied for the removal of the silex. As such a carbonate as, for example, carbonate of soda can be obtained for a low price, the process of desilexing the rattan can be cheaply carried out. The silex can be removed by using carbonate of soda, also carbonate of ammonia, the latter being used with such precautions as to allow of a recovery of volatilized salt. The use of these simple substances allows likewise of an easy recovery of the spent salts. So in the case of carbonate of soda the evaporation of the liquids and the heating of the resulting salt in a reverberatory furnace regenerates the original compound and allows it to be used again for the removal of silex. I use of such salt generally a ten per cent. solution in water, and I let this solution act on the cane or cane-strands. I confine myself to a temperature of 60° centigrade, or below 60° centigrade, generally between 50° and 60° centigrade. The time of action depends upon the nature of the cane and the strength of the solution. When a fresh solution is employed, the cane may in some cases require about twenty-four hours' treatment in a ten per cent. soda-ash solution at 60° centigrade. The cane during this treatment with carbonate of an alkali assumes a dark color, which color, if desired, can be removed by bleaching. In order not to be compelled to wash the alkaline liquors completely out of the cane, I use for bleaching a solution of hypochlorite of soda produced by the action of a solution of carbonate of soda upon a solution of chloride of lime. To prevent injury to the cane while wet, the cane is placed on racks, and by moving the racks whenever it is desired to transport the cane from one place to another handling of the cane is prevented.

In carrying out my invention with a soda-ash solution I dissolve commercial soda-ash in water. I take about one part, by weight, of soda-ash containing about ninety per cent. of dry and pure carbonate of soda, and as free as possible from caustic soda, and dissolve the same in about ten parts, by weight, of water. For convenience of operation the soda-ash solution is prepared in a tank adapted to the length of the cane-strands to be treated.

The tank should be so arranged that new liquor may be fed into the tank by a pipe entering at or near the bottom, and said tank should be provided with a heating apparatus—such, for example, as a steam-heating apparatus. The new liquor fed into the tank is either water to replace the water lost by evaporation or soda-ash solution, so that the strength and quantity of liquor in the tank may be kept uniform.

The soda-ash solution in the tank is heated to about 60° centigrade and the cane is introduced into the liquor. The cane remains in the liquor, the temperature of the liquor being kept at about 60° centigrade, until the silex or glaze has been sufficiently softened or removed from the cane. This removal or softening of the silex occupies generally about twenty-four hours. When the silex is sufficiently removed or softened, the racks bearing the cane are withdrawn from the solution of soda-ash and placed into pure water, where most of the soda is removed from the cane. The pure water is thus converted into a weak soda solution, which weak soda solution can be fed back into the tank containing the original soda solution, to be used in subsequent treatments of cane. Wasting or loss of the solution is thus avoided, and the soda solution can be conveniently kept at the same volume and strength. By having the pure water in a tank placed at a higher level than the tank containing the soda solution the liquid can be conveniently fed from the higher into the lower tank. After soaking the soda-treated cane in water for about four hours the cane is ready to be bleached. The liquor used for bleaching is prepared from a solution of chloride of lime by adding thereto a solution of soda-ash as long as a precipitate of carbonate of lime is produced. The bleaching solution is then allowed to stand until it becomes clear, or until all precipitate settles. The clear bleaching solution is then drawn off from the precipitate.

To prepare four gallons of bleach-liquor I employ about one pound of chloride of lime. The cane is immersed in this bleach-liquor for about three hours, or until the cane is bleached to the extent required. As the color of the cane is darker or lighter, the bleaching process takes a longer or shorter time. After bleaching, the cane is removed from the bleach-liquor and washed and then treated with a highly-diluted weak acid, then washed again and dried. By using such an acid as, for example, sulphurous acid, the chlorine remaining in the cane is destroyed. The amount of acid used is about one part, by weight, of acid to about one thousand parts, by weight, of water.

If the soda-ash solution after repeated use fails to act upon the cane, such solution may be evaporated in a suitable manner—for example, in a shallow pan by waste heat—and the soda-ash regenerated by heating the remaining salts in a reverberatory furnace for such a period of time until the organic matter is destroyed. Heating in a reverberatory furnace for a longer period of time than the period of time indicated must be avoided to prevent the formation of caustic alkali. If the cane or cane-strands after being desilexed are to be dyed a dark color or black, the bleaching of the cane or strands may be omitted.

An apparatus which can be conveniently used in treating rattan according to my invention is illustrated in the accompanying drawing in side elevation.

A is a tank or vessel for soda-ash solution. B is a pipe and conduit communicating with the bottom or lower part of the tank A. Fluid can be fed into the pipe B through its receiving end or mouth C. D is a tank in which the cane coming from the tank A can be washed. The spent liquor from the tank or vessel D can be fed through a stop-cock, E, to the pipe B.

In United States Patents Nos. 343,896, 343,897, and 343,952, all of June 15, 1886, I have set forth methods for treating rattan; but the process of this present application has the advantages that the cane is not treated by boiling liquor, and consequently the cane is not apt to become fibrous, and as the process of this application can be carried out by soda-ash, which is a cheap article, this application sets forth an economic or cheap process for treating rattan.

What I claim is—

1. The herein-described process of treating rattan, which consists in exposing the rattan to the action of a solution of carbonate of an alkali, (such as soda-ash containing about ninety per cent. of carbonate of soda, and as free as possible from caustic soda,) said solution being kept at a temperature above 50° centigrade, and below the boiling point, substantially as set forth.

2. The herein-described process of treating rattan, which consists in first exposing the rattan to the action of a solution of carbonate of an alkali, (such as soda-ash containing about ninety per cent. of carbonate of soda, and as free as possible from caustic soda,) said solution being kept at a temperature above 50° centigrade, and below the boiling-point, and exposing the rattan to the action of a bleaching agent, substantially as set forth.

3. The herein-described process of treating rattan, which consists in first exposing the rattan to the action of a solution of carbonate of an alkali, (such as soda-ash containing about ninety per cent. of carbonate of soda, and as free as possible from caustic soda,) said solution being kept at a temperature above 50° centigrade, and below the boiling point, exposing the rattan to the action of a bleaching agent, and treating the bleached rattan with weak acid, substantially as set forth.

In testimony whereof I have hereunto set my hand and seal in the presence of two subscribing witnesses.

HERMANN ENDEMANN. [L. S.]

Witnesses:
W. HAUFF,
E. F. KASTENHUBER.